United States Patent [19]
Ohtomo et al.

[11] Patent Number: 6,046,800
[45] Date of Patent: Apr. 4, 2000

[54] POSITION DETECTION SURVEYING DEVICE

[75] Inventors: Fumio Ohtomo; Haruhiko Kobayashi; Shinji Yamaguchi, all of Tokyo, Japan

[73] Assignee: Kabushiki Kaisha Topcon, Tokyo, Japan

[21] Appl. No.: 09/015,449

[22] Filed: Jan. 29, 1998

[30] Foreign Application Priority Data

Jan. 31, 1997 [JP] Japan ................................. 9-033217

[51] Int. Cl.[7] .............................. G01B 11/26; G01C 3/08
[52] U.S. Cl. ................ 356/141.1; 356/4.01; 356/139.07; 356/141.4
[58] Field of Search ............................... 356/141.1, 4.01, 356/5.01, 5.1, 139.07, 139.08, 141.4

[56] References Cited

U.S. PATENT DOCUMENTS

| | | |
|---|---|---|
| 3,897,151 | 7/1975 | LeCroy . |
| 4,401,886 | 8/1983 | Pond et al. . |
| 4,721,385 | 1/1988 | Jelalian et al. . |
| 4,950,075 | 8/1990 | Ichinose et al. . |
| 5,098,185 | 3/1992 | Watanabe . |
| 5,210,586 | 5/1993 | Grage et al. . |
| 5,485,009 | 1/1996 | Meyzonnette et al. ................ 356/5.09 |

*Primary Examiner*—Stephen C. Buczinski
*Attorney, Agent, or Firm*—Baker & Botts, L.L.P.

[57] ABSTRACT

The present invention relates to a position detection surveying device for detecting a position of a target, and more particularly to a position detection surveying device which is most suitable for an automatic surveying apparatus and, without using expensive acoustooptic devices, can be miniaturized and manufactured so that it saves the electric power. In the present invention, a light emitting means irradiates a target with a light which is sector-shaped in an up-and-down direction, and a light receiving means receives a reflected light from the target, and a rotating means rotates in a horizontal direction a portion comprising at least the light emitting means and the light receiving means, and a computational processing means is able to detect a position of the target in accordance with a light reception signal from the light receiving means.

5 Claims, 14 Drawing Sheets

(b)  (a)

(b) (a)

— MAXIMUM LIGHT RECEIVING LEVEL

— NO AMOUNT OF LIGHT

FIG. 13
(a)
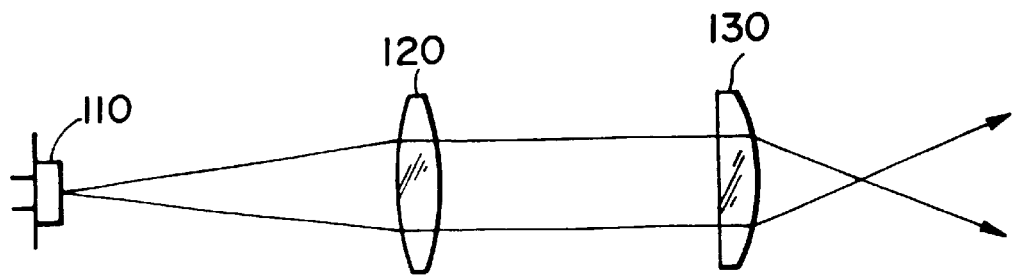
(b)
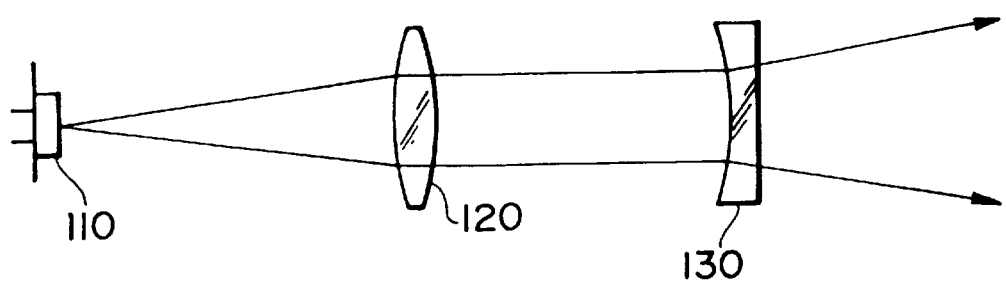
FIG. 14
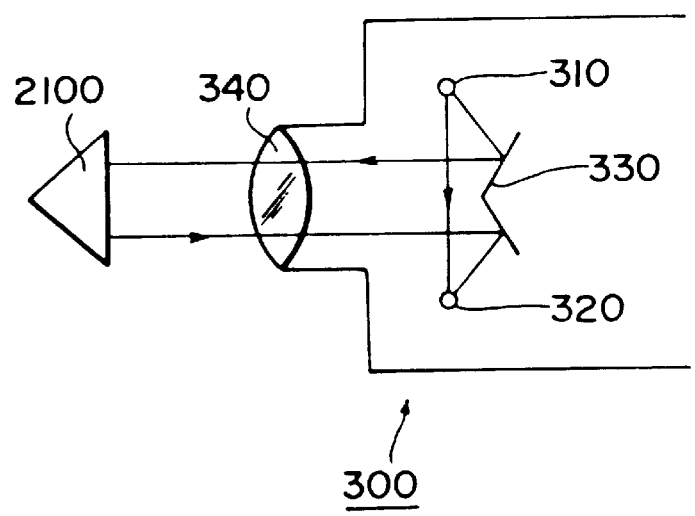

6,046,800

POSITION DETECTION SURVEYING DEVICE

BACKGROUND OF THE INVENTION

The present invention relates to a position detection surveying device for detecting a position of a target, and more particularly to a position detection surveying device which is most suitable for an automatic surveying apparatus and, without using expensive acoustooptic devices, can be miniaturized and manufactured so that it saves the electric power.

An automatic surveying apparatus, which enables a position of a target to be detected, has been recently developed, and a one-man operated surveying is now being employed widely. This automatic surveying apparatus comprises units such as a scanning unit, a range measuring unit, and an angle measuring unit, and was constituted by means such as a driving means for rotating the main body in a horizontal direction and a driving means for rotating a mirror cylinder in a vertical direction.

A detection for a prism set on a target is performed using a reflected light of a light launched out from the scanning unit toward the target. The constitution of the detecting process is as follows: The reflected and received light is converted into a light reception signal at a light receiving unit. The light reception signal is feedback-controlled into rotating means or the driving means, thereby causing the automatic surveying apparatus to turn toward a direction of the target.

A laser light launched out from the scanning unit is deflected in both a horizontal and a vertical direction by acoustooptic devices. The state of the laser light thus deflected resembles that of a laser light whose specified part in the launched direction has been, for example, Lissajous-scanned.

Based on FIG. 15, the description will be given below in connection with deflecting means using the acoustooptic devices:

A laser diode 21 emits an infrared laser light as a scanning light, and a collimator lens converts the infrared laser light into a parallel pencil of rays. Both a horizontal deflecting device 23 and a vertical deflecting device 24 are acoustooptic devices in this case. The horizontal deflecting device 23 and the vertical deflecting device 24 deflect the infrared laser light in a horizontal direction H and in a vertical direction V, respectively. However, the deflecting means employing the above-mentioned acoustooptic devices are very expensive, causing an increase in the production cost. In addition to this, the deflecting means are accompanied by a heat generation, thus increasing the power consumption. These resulted in a problem that, practically, it becomes difficult to drive them using small-sized batteries.

Accordingly, there was need of carrying a line power supply or a large-sized battery pack, which led to serious problems of causing a reduction in portability as well as a decrease in the operation efficiency in surveying.

Furthermore, the acoustooptic devices have a limited deflection angle. This resulted in another problem that, in order to enlarge scanning extent, there is need of rotating the mirror cylinder in a vertical direction.

SUMMARY OF THE INVENTION

The present invention provide a position detecting/surveying device in which a light emitting means irradiates a target with a light which is sector-shaped in an up-and-down direction, and a light receiving means receives a reflected light from the target, and a rotating means rotates in a horizontal direction a portion comprising at least the light emitting means and the light receiving means, and a computational processing means is able to detect a position of the target in accordance with a light reception signal from the light receiving means.

BRIEF DESCRIPTION OF THE DRAWINGS

The figures show embodiments of the present invention in which:

FIG. 13(a) is a diagram explaining the principle of the present invention;

FIG. 13(b) is a diagram explaining the principle of the present invention;

FIG. 14 is a diagram illustrating the optical wave range finder; and

DETAILED DESCRIPTION OF THE PREFERRED EMBODIMENTS

"Principle"

First, based on FIGS. 13(a) and 13(b), the description will be given below concerning the principle of a light emitting means 100 for irradiating with "a light which is sector-shaped in an up-and-down direction" as being explained in the present invention:

The light emitting means 100, as shown in FIGS. 13(a) and 13(b), is constituted by a light source 110, a collimating lens 120, and a cylindrical lens 130.

The light source 110 produces a laser light, and in this embodiment, a laser diode is employed as the light source.

The collimating lens 120 is provided for converting the laser light from the light source 110 into a parallel pencil of rays.

Employed as the cylindrical lens 130 can be either a lens the one face of which, when seen from the side thereof, is a convex lens as is shown in FIG. 13(*a*), or a lens one face of which, when seen from the side thereof, is a concave lens as is shown in FIG. 13(*b*).

Consequently, as shown in FIG. 13(*a*), a parallel pencil of rays launched into the cylindrical lens 130 is converged at a focal length F. At a position away from the focal length F, the parallel pencil of rays becomes a light which is sector-shaped in an up-and-down direction.

Also, as shown in FIG. 13(*b*), when a parallel pencil of rays is launched into the cylindrical lens 130, a light which is sector-shaped in an up-and-down direction is launched out.

"First Embodiment"

Figure 1:
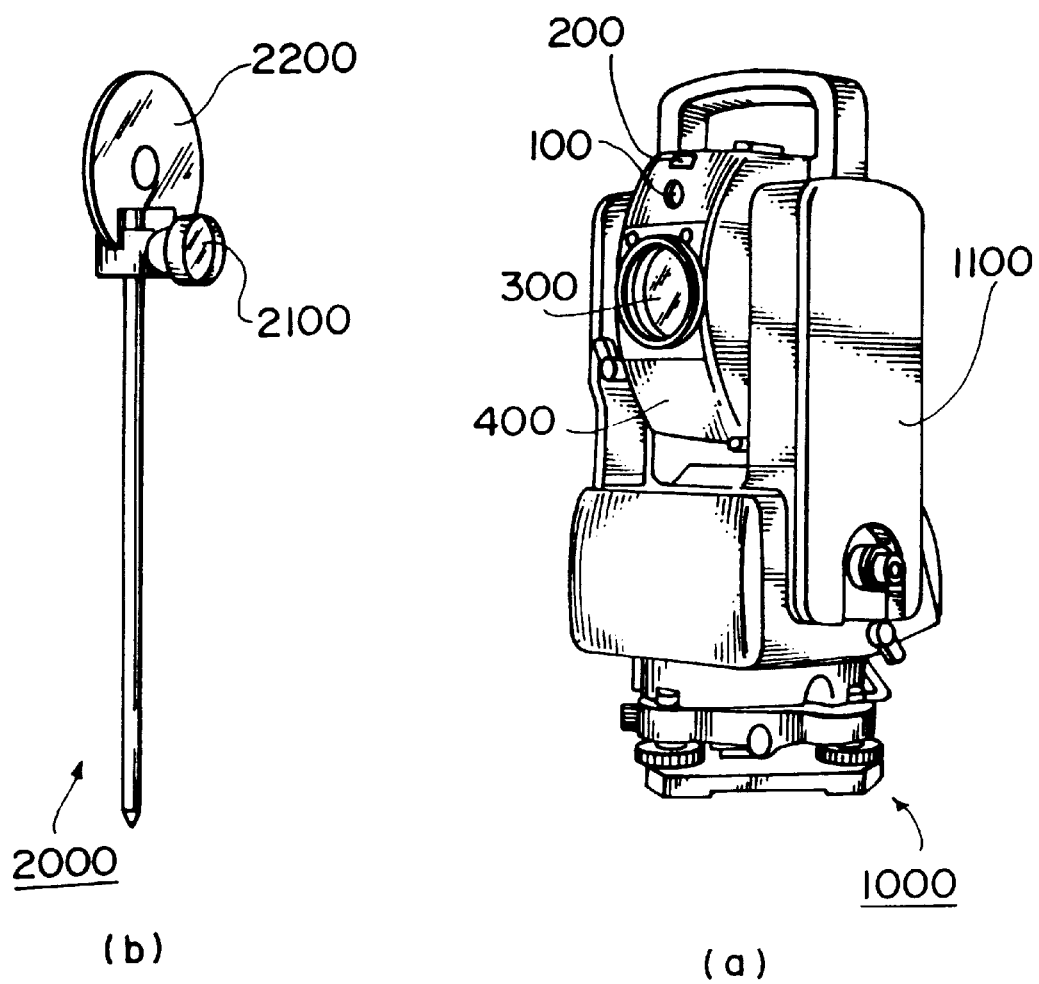
FIGS. 1(a) and 1(b) are perspective views showing an automatic surveying device and a target according to a first embodiment of the present invention.

Described below, based on the accompanying drawings, is the description of a first embodiment of the present invention:

FIG. 1(*a*) is a perspective view showing an automatic surveying device 1000 according to a first embodiment of the present invention. The automatic surveying device 1000 is constituted by a main body 1100, a light emitting means 100, a light receiving means 200, an optical wave range finder 300, and a mirror cylinder 400. In the first embodiment, the optical wave range finder 300 is provided in coaxially with a collimating telescope. The light emitting means 100 irradiates with a light in order to detect a prism 2100 on a target 2000 shown in FIG. 1(*b*). Whatever light emitting means can be employed as the light emitting means 100 in the embodiment as long as, as explained in the above-mentioned "Principle", it is the kind of emitting means that is able to irradiate with "a light which is sector-shaped in an up-and-down direction".

The light receiving means 200 is a means for receiving a reflected light reflected by the prism 2100 set on the target 2000. Whatever element can be employed as the light receiving means 200 as long as it is the kind of element that is able to convert the reflected light into an electrical signal.

The optical wave range finder 300 corresponds to a range measuring means for measuring a distance to the target 2000. For example, employed as the optical wave range finder 300 in the present embodiment can be range finders such as one using phase difference measurement method or one using pulse measurement method. Incidentally, based on FIG. 14, the description will be given below concerning an example of the optical wave range finder 300.

The optical wave range finder 300 comprises a prism 2100 for reflecting a range measuring light toward a launched direction, a light emitting part 310 for emitting the range measuring light, a light receiving part 320 for receiving the reflected light from the prism 2100, a mirror 330 for reflecting the range measuring light from the light emitting part 310 toward the prism 2100 and causing the reflected light from the prism 2100 to face the light receiving part 320, and an object lens 340 for collimating the range measuring light to cause the reflected light to be focused on the light receiving part 320.

The optical wave range finder 300 is a range measuring apparatus using phase difference measurement, and comprises the light emitting part 310 and the light receiving part 320. The light receiving part is able to easily capture the amount of a light from the light emitting part.

Figure 4:
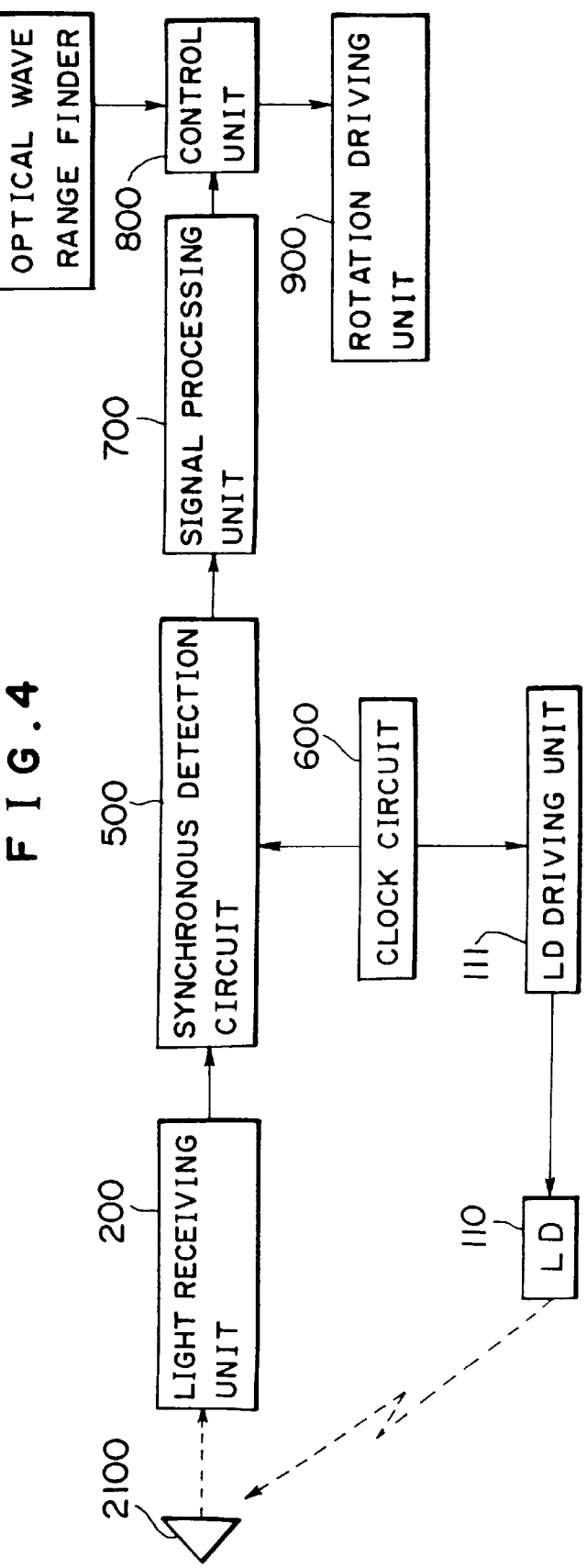
FIG. 4 is a diagram explaining an electrical constitution of the automatic surveying device according to the first embodiment.

A mirror cylinder 400 is constituted so that it can be rotated in a vertical direction, and installed in the mirror cylinder are the light emitting means 100, the light receiving means 200, and the optical wave range finder 300. Next, based on FIG. 4, the description will be given below regarding an electrical constitution of the automatic surveying device 1000 according to the first embodiment.

The automatic surveying device 1000 according to the first embodiment is constituted by a laser diode 110, a laser diode driving unit 111, a light receiving unit 200, an optical wave range finder 300, a synchronous detection circuit 500, a clock circuit 600, a signal processing unit 700, a control unit 800, and a rotation driving unit 900.

The laser diode 110 and the laser diode driving unit 111 constitute the light emitting means 100. The laser diode driving unit 111, following a clock signal from the cock circuit 600, drives the laser diode 110 and causes it to generate a laser light.

The synchronous detection circuit 500 is a circuit for performing a synchronous detection for detecting, in accordance with a clock signal from the cock circuit 600, a light reception signal of a reflected laser light from a light reception signal of the light receiving unit 200.

The clock circuit 600 is a circuit for forming a clock signal which determines a timing for the synchronous detection circuit 500 to perform a synchronous detection and a timing to drive the laser diode driving unit 111.

The signal processing unit 700 is a unit for performing a signal processing such as a waveform shaping. The control means 800, which corresponds to a computational processing means and includes CPU, exercises a control over the whole device as well as performs many kinds of computations such as a decision of an angle and so on.

The control unit 800, in accordance with an processing signal from the signal processing unit 700, performs computations and exercises feedback-control so as to cause the main body 1100 of the automatic surveying device to face the prism 2100.

The rotation driving unit 900 is a unit for exercising a control for rotating the main body 1100 of the automatic surveying device in a horizontal direction.

Moreover, based on FIG. 5, the description will be given below concerning a mechanism for rotating the main body 1100 of the automatic surveying device in a horizontal and vertical direction. Incidentally, this mechanism corresponds to a rotating means.

Figure 5:
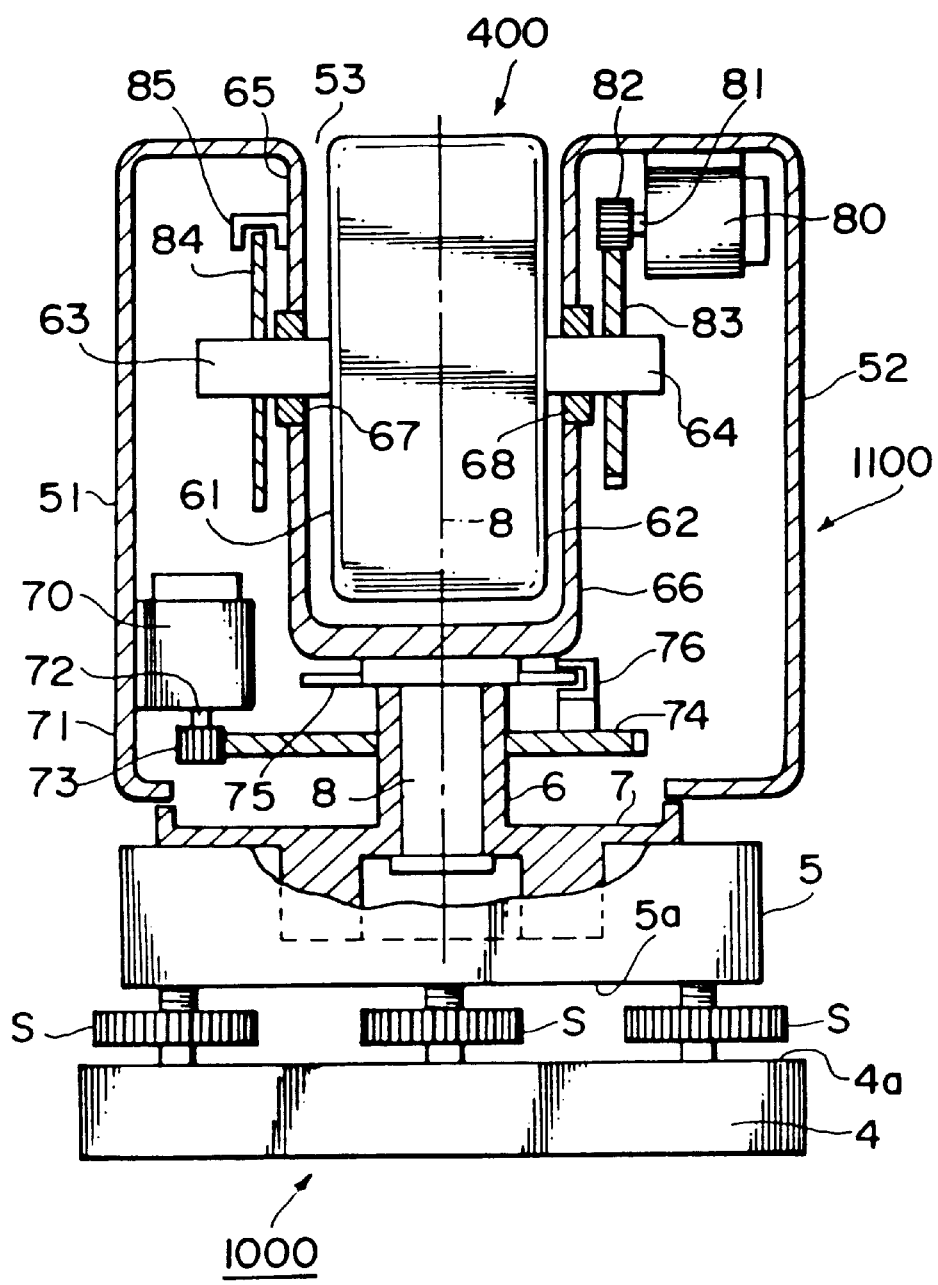
FIG. 5 is a diagram illustrating a rotating means in the first embodiment.

The automatic surveying device 1000, as shown in FIG. 5, comprises a fixed stand 4 and a base stand 5 attached to the fixed stand 4. Leveling screws S, S, S are able to adjust an angle formed by a plane 5*a* of the base stand 5 and a plane 4*a* of the fixed stand 4. Fixed to the base stand 5 is a bearing member 7 having a bearing part 6 extending in a vertical direction, and attached rotatably to the bearing member 7 is a rotating shaft 8 extending in a vertical direction. Attached to the rotating shaft 8 is the main body 1100 of the automatic surveying device. The main body 1100 is constituted so that it can, together with the rotating shaft 8, be rotated in a direction horizontal to the base stand 5. Furnished with the main body 1100 of the automatic surveying device are an adjustment knob for fine-adjusting an altitude angle and an adjustment knob for adjusting a horizontal angle.

Formed on the main body 1100 of the automatic surveying device are two extending parts 51, 52 extending upward from both sides of the main body. The mirror cylinder 400 is located at a pitted portion 53 between the extending parts 51, 52. Provided on side plates 61, 62 of the mirror cylinder 400 are horizontal shafts 63, 64 extending in a horizontal direction. The horizontal shafts 63, 64 are rotatably held through bearings 67, 68 by side plates 65, 66 of the extending parts 51, 52 so that the mirror cylinder 400 can rotate in a vertical direction.

The rotation of the main body 1100 of the automatic surveying device is performed by a motor 70 set within the main body 1100, and the motor 70 is attached to a side plate 71 of the main body 1100. Furnished on a driving shaft 72 of the motor 70 is a gear 73 which is engaged with a spur gear 74 fixed at the bearing part 6. The spur gear 74 is concentric with the rotating shaft 8. This, through a driving by the motor 70, makes it possible for the gear 73 to shift while rotating around the spur gear 74, thus allowing the main body 1100 to rotate with the rotating shaft 8.

Attached at an upper portion of the rotating shaft 8 is a horizontal angle graduating scale 75, and furnished on the spur gear 74 is a horizontal angle reading encoder 76 for reading a horizontal graduation of the horizontal angle graduating scale 75. The horizontal angle reading encoder 76 is a device for generating a pulse every time the horizontal angle graduating scale 75 rotates by an infinitesimal angle.

The rotation of the mirror cylinder 400 is performed by a motor 80 set in the extending part 52. Furnished on a driving shaft 81 of the motor 80 is a gear 82 which is engaged with a spur gear 83 fixed at the horizontal shaft 64. This, through a driving by the motor 80, causes the spur gear 83 to rotate, thus allowing the horizontal shafts 63, 64 to rotate with the mirror cylinder 400.

Attached at the horizontal shaft 63 is an altitude angle graduating scale 84, and furnished in the extending part 51 is an altitude angle reading encoder 85 for reading the altitude graduation. The altitude angle reading encoder 85 is a device for generating a pulse every time the altitude angle graduating scale 84 rotates by an infinitesimal angle.

Figure 6:
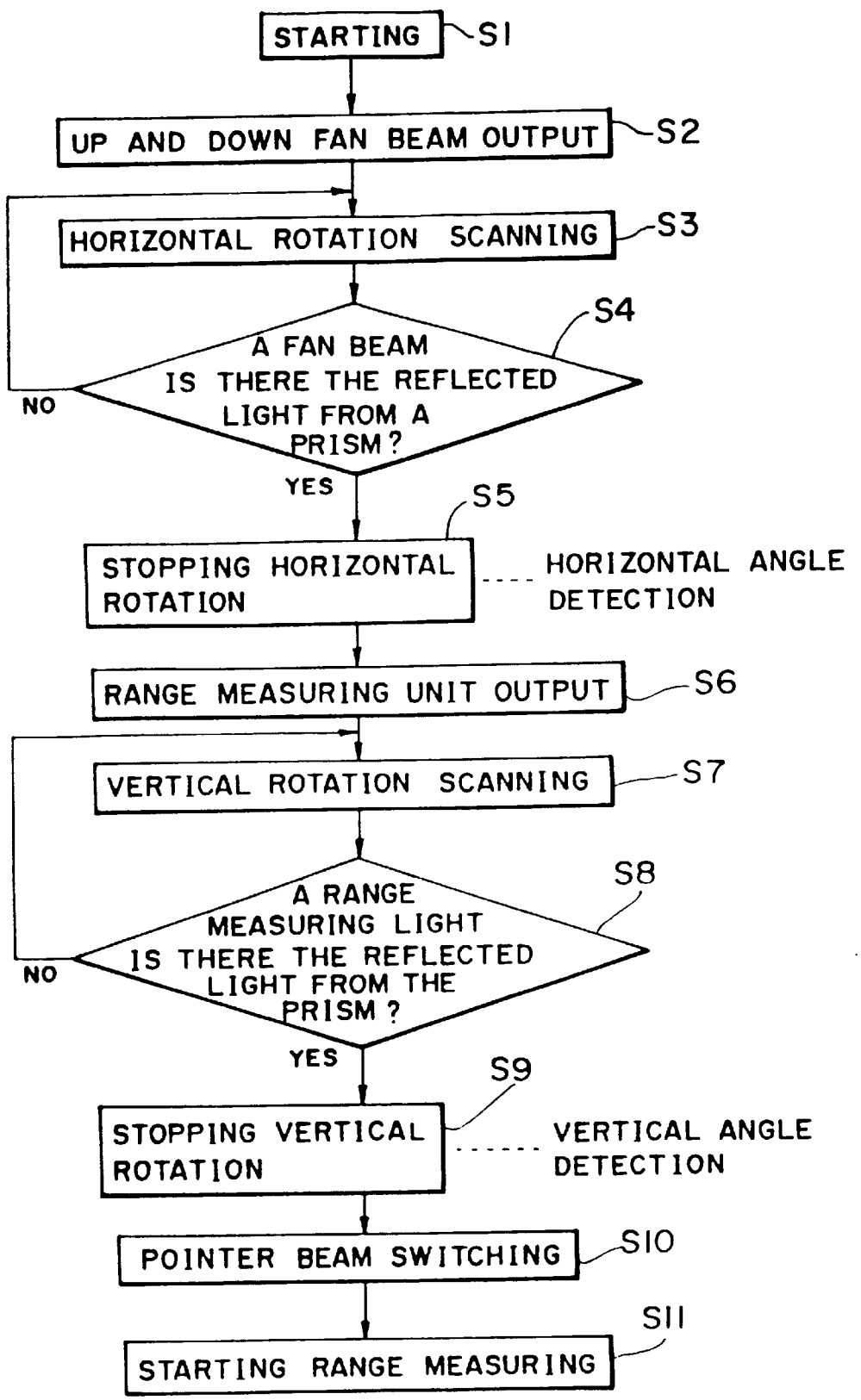
FIG. 6 is a diagram explaining an operation of the first embodiment.

Next, based on FIG. 6, the description will be given below concerning an operation of the first embodiment.

Figure 7:
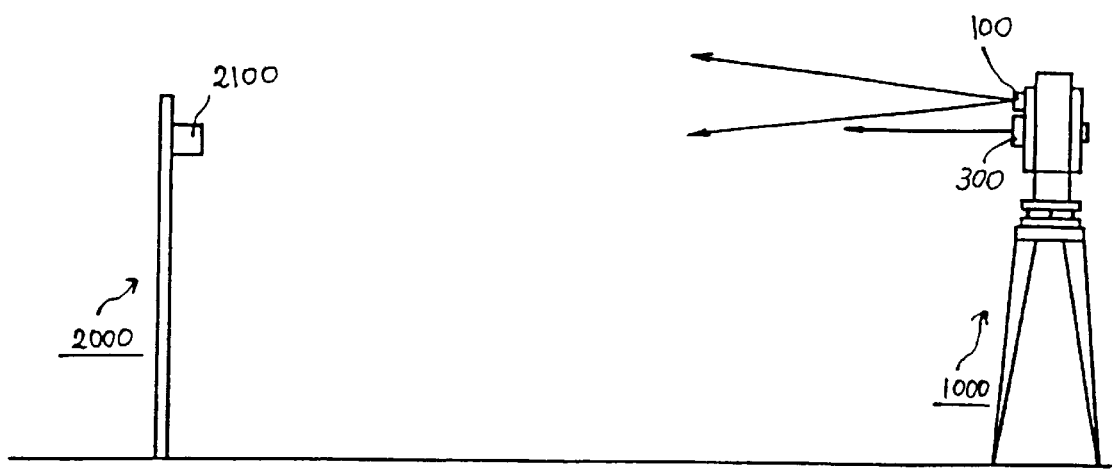
FIG. 7 is a diagram illustrating a position relationship between an automatic surveying device and a target.

At first, as shown in FIG. 7, the automatic surveying device 1000 is located on a tripod.

First, at Step 1 (hereinafter, abbreviated as S1), a power supply is switched on and a measurement is started.

At S2, the laser diode driving unit 111, following a timing signal from the cock circuit 600, drives the laser diode 110, and a light which is sector-shaped in an up-and-down direction (an up-and-down fan beam) is launched out from the cylindrical lens 130.

Then, at S3, the control means 800 controls and drives the rotation driving unit 900 and rotates the motor 70, thus rotating the main body 1100 of the surveying device in a horizontal direction.

Next, at S4, the control means 800 judges whether or not a reflected light from the target 2000 can be detected at the light receiving unit 200. Since the light which is sector-shaped in an up-and-down direction (an up-and-down fan beam) is being launched out from the cylindrical lens 130, in the case of being situated at the position facing the prism 2100 on the target 2000, a light launched into the prism 2100 is reflected and the reflected light is launched into the light receiving unit 200.

When the reflected light has been launched into the light receiving unit 200, a light reception signal, after having been processed by a signal-processing such as a waveform shaping at the signal processing unit 700, is inputted into the control means 800. Then, if the control means 800 recognizes an input of the reflected light, the operation goes to S5. At S5, the control means 800 controls the rotation driving unit 900 and stops the rotation of the motor 70 to halt the rotation of the main body 1100 of the surveying device, thus determining the horizontal angle.

Alternatively, at S4, if the control means 800 does not recognize an incident of the reflected light into the light receiving unit 200, the operation goes back to S3, and the control means allows the main body 1100 of the surveying device to continue rotating in the horizontal direction.

After the rotation of the main body 1100 of the surveying device is halted at S5, the operation goes to S6. At S6, the control means 800 drives the optical wave range finder 300. Then, at S7, the control means 800 controls and drives the rotation driving unit 900 and rotates the motor 80, thus rotating the mirror cylinder 400 in a vertical direction.

Next, at S8, the control means 800 judges whether or not the reflected light has been detected at the optical wave range finder 300. If, at S8, the control means 800 recognizes a detection of the reflected light, the operation goes to S9. At S9, the control means 800 controls the rotation driving unit 900 and stops the rotation of the motor 80, thus halting the rotation of the mirror cylinder 400.

Figure 9:
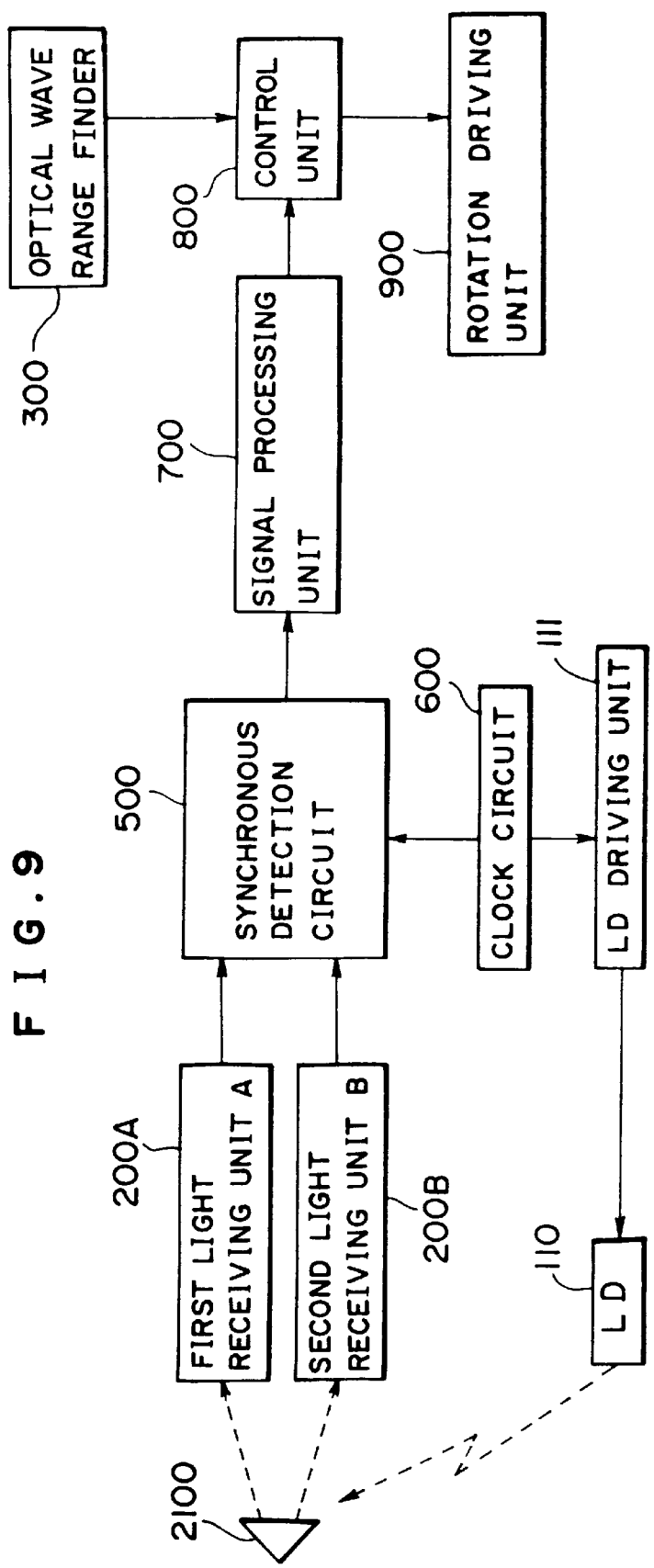
FIG. 9 is a diagram explaining an electrical constitution of the automatic surveying device 1000 according to the second embodiment.

Then, as shown in FIG. 9, the control means 800 computes the center of mass using both an amount of the reflected light at the optical wave range finder 300 and an angle position based on the encoder 85, and detects the altitude angle from the position of the center of mass.

Alternatively, at S8, if the control means 800 does not recognize the detection of the reflected light at the optical wave range finder 300, the operation goes back to S7, and the control means allows the mirror cylinder 400 to continue rotating in the vertical direction.

After determining the horizontal angle and the altitude angle at S5 and at S9, respectively, the operation goes to S10, where the cylindrical lens 130 is switched off and removed, and a pointer beam is generated. Then, at S11, the optical wave range finder 300 performs the range measuring.

The pointer beam is projected into the center of a target plate 2200 in the target 2000. This makes it possible to make sure that the main body 1100 of the surveying device has faced the prism 2100.

The first embodiment constituted above makes it possible to automatically determine a position of the automatic surveying device 1000 so that it turns toward a direction of the prism 2100 on the target 2000.

Incidentally, employed as the optical wave range finder 300 may be the one with which the automatic surveying device 1000 has been equipped from the beginning, or may be the type of range finder that has been manufactured by adding the constitution in the first embodiment to a prior art optical wave range finder 300.

Also, the first embodiment has been devised by applying the position detecting apparatus in the present invention to the automatic surveying device 1000, but the position detecting apparatus is applicable to any other surveying apparatus, not being limited to the automatic surveying device 1000.

Moreover, the light beam employed in the optical wave range finder 300 has a spread of an order of 5 to 7 minutes. This characteristic, using the light beam employed in the optical wave range finder 300 and based on the above-mentioned principle, makes it possible to precisely determine the position.

"Second Embodiment"

Figure 2:
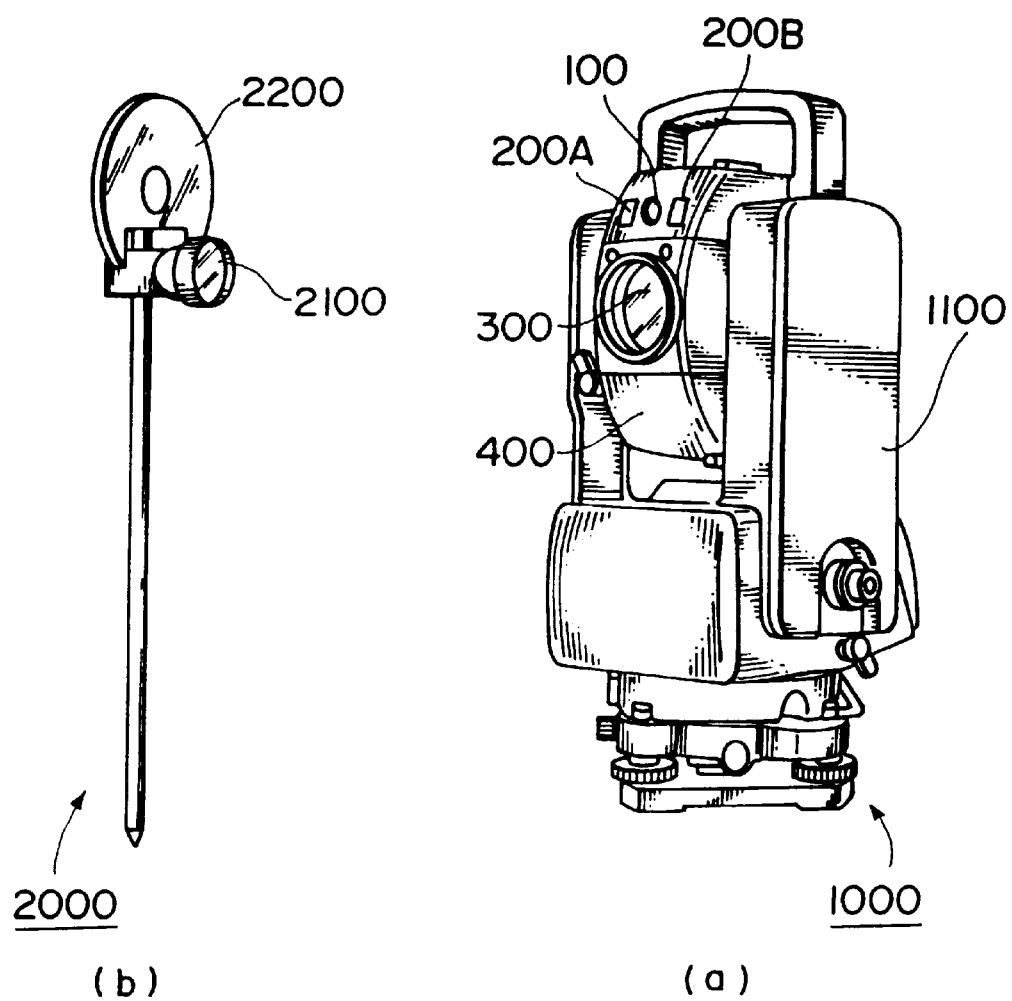
FIGS. 2(a) and 2(b) are perspective views showing an automatic surveying device and a target according to a second embodiment of the present invention.

Described below, based on the accompanying drawings, is the description of a second embodiment of the present invention:

FIG. 2(*a*) is a perspective view showing an automatic surveying device 1000 according to a second embodiment of the present invention. The automatic surveying device 1000 is constituted by a main body 1100 of the automatic surveying device, a light emitting means 100, a first light receiving means 200A, a second light receiving means 200B, an optical wave range finder 300, and a mirror cylinder 400.

In the second embodiment, the optical wave range finder 300 is provided in coaxially with a collimating telescope.

The light emitting means 100 is a means for irradiating with a light a prism 2100 (a corner cube prism) on a target 2000 shown in FIG. 2(*b*). Whatever light emitting means can be employed as the light emitting means 100 in the present embodiment as long as, as explained in the above-mentioned "Principle", it is the kind of emitting means that is able to irradiate with "a light which is sector-shaped in an up-and-down direction".

The light receiving means 200 is a means for receiving a reflected light reflected by the prism 2100 set on the target 2000. Whatever element can be employed as the light receiving means 200 as long as it is the kind of element that is able to convert the reflected light into an electrical signal.

Figure 3:
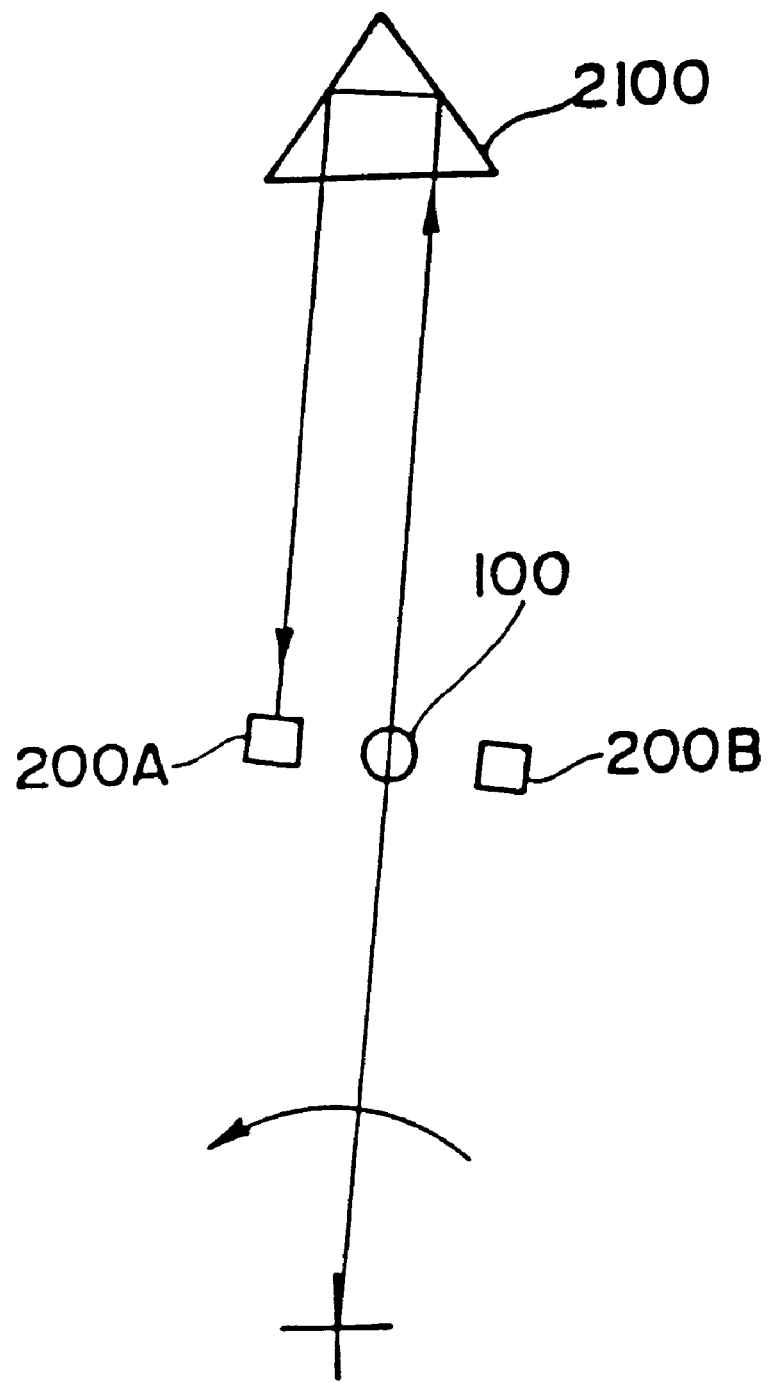
FIG. 3(a) is a diagram illustrating a light receiving means.
FIG. 3(b) is a diagram illustrating a light receiving means.
Figure 3B:
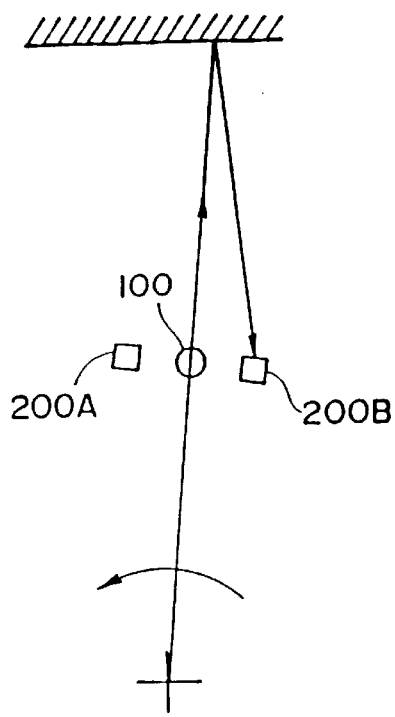

The light receiving means 200 according to the second embodiment, as shown in FIGS. 3(*a*) and 3(*b*), is configured in pairs with the light emitting means 100 sandwiched therebetween. Namely, the light receiving means 200 is constituted by both the first light receiving unit 200A and the second light receiving unit 200B.

FIG. 3(*a*) shows a light-received state in which a light is received from the prism 2100 when the main body 1100 of the automatic surveying device rotates in a counterclockwise direction, and FIG. 3(*b*) shows a light-received state in which a light is received from an unnecessary reflection plane when the main body 1100 rotates in a counterclockwise direction as is the case with FIG. 3(*a*).

If a light is reflected by the prism 2100, i.e. a recurrent reflection member, the reflected light is launched into the first light receiving means 200A first, and then is launched into the second light receiving means 200B.

If a light is reflected by an unnecessary reflection plane in FIG. 3(*b*) such as a facing mirror, the reflected light is launched into the second light receiving means 200B first.

When the main body 1100 of the automatic surveying device has rotated in a clockwise direction, a reflected light reflected by the prism 2100 is launched into the second light receiving unit 200B first, and a reflected light reflected by the unnecessary reflection plane is launched into the first light receiving unit 200A first.

Accordingly, by recognizing which of the two light receiving units, i.e. the first light receiving unit 200A and the second light receiving unit 200B, a reflected light is launched into first, it becomes possible to distinguish an unnecessary reflection.

Next, based on FIG. 9, the description will be given below regarding an electrical constitution of the automatic surveying device 1000 according to the second embodiment.

The automatic surveying device 1000 according to the second embodiment is constituted by a laser diode 110, a laser diode driving unit 111, a first light receiving unit 200A, a second light receiving unit 200B, an optical wave range finder 300, a synchronous detection circuit 500, a clock circuit 600, a signal processing unit 700, a control unit 800, and a rotation driving unit 900.

The laser diode 110 and the laser diode driving unit 111 constitute the light emitting means 100. The laser diode driving unit 111, following a clock signal from the cock circuit 600, drives the laser diode 110 and causes it to generate a laser light.

The synchronous detection circuit 500 is a circuit for performing a synchronous detection for detecting, in accordance with a clock signal from the cock circuit 600, a light reception signal of a reflected laser light from a light reception signal of the first light receiving unit 200A and the second light receiving unit 200B.

The clock circuit 600 is a circuit for forming a clock signal which determines a timing for the synchronous detection circuit 500 to perform a synchronous detection and a timing to drive the laser diode driving unit 111.

The signal processing unit 700 is a unit for performing a signal processing such as a waveform shaping as well as for computing a difference between the first light receiving unit 200A and the second light receiving unit 200B.

The control means 800, which corresponds to a computational processing means and includes CPU, exercises a control over the whole device as well as performs many kinds of computations such as a decision of an angle and so on.

The control unit 800, in accordance with an processing signal from the signal processing unit 700, performs computations and exercises feedback-control so as to cause the main body 1100 of the automatic surveying device to turn toward a direction of the prism 2100.

The rotation driving unit 900 is a unit for exercising a control for rotating the main body 1100 of the automatic surveying device in a horizontal direction.

Figure 10:
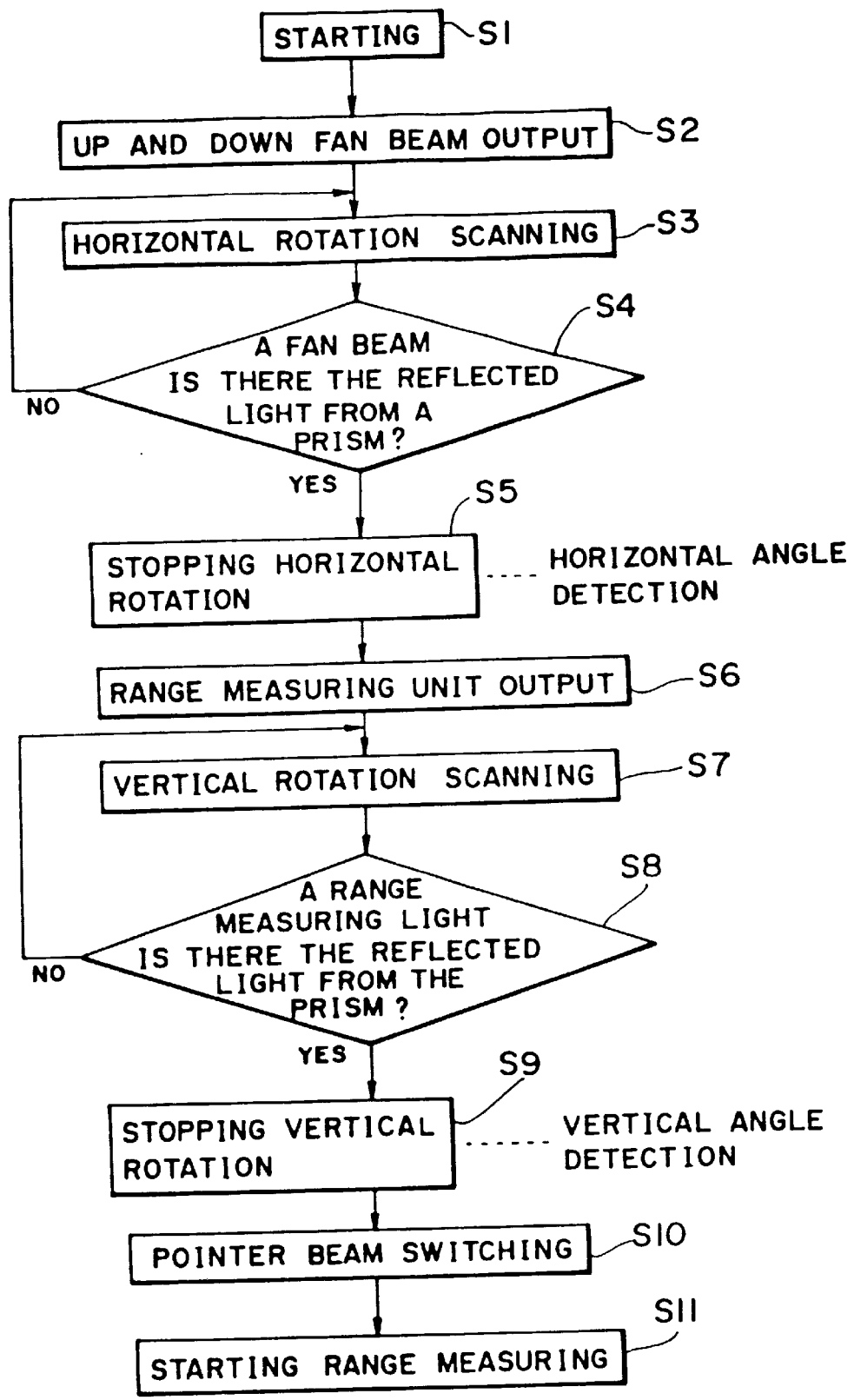
FIG. 10 is a diagram explaining an operation of the second embodiment.

Next, based on FIG. 10, the description will be given below concerning an operation of the second embodiment.

At first, as shown in FIG. 7, the automatic surveying device 1000 is located on a tripod.

First, at Step 1 (hereinafter, abbreviated as S1), a power supply is switched on and a measurement is started. At S2, the laser diode driving unit 111, following a timing signal from the cock circuit 600, drives the laser diode 110, and a light which is sector-shaped in an up-and-down direction (an up-and-down fan beam) is launched out from a cylindrical lens 130.

Then, at S3, the control means 800 controls and drives the rotation driving unit 900 and rotates a motor 70, thus rotating the main body 1100 of the surveying device in a horizontal direction.

Next, at S4, the control means 800 judges whether or not a reflected light from the target 2000 can be detected at the first light receiving unit 200A or the second light receiving unit 200B. Since the light which is sector-shaped in an up-and-down direction (an up-and-down fan beam) is being launched out from the cylindrical lens 130, feedback-control is performed until the main body 1100 of the surveying device is situated at a position facing the prism 2100 on the target 2000.

When the reflected light has been launched into the first light receiving unit 200A or the second light receiving unit 200B, a light reception signal, after having been processed by a signal-processing such as a waveform shaping at the signal processing unit 700, is inputted into the control means 800. Then, if the control means 800 recognizes an input of the reflected light as the reflected light from the target, the operation goes to S5. At S5, the control means 800 controls the rotation driving unit 900 and stops the rotation of the motor 70 to halt the rotation of the main body 1100 of the surveying device, thus determining the horizontal angle. Also, if the control means 800 recognizes the input of the reflected light as an unnecessary reflection, the operation does not go to S5, and the control means allows the main body of the surveying device to continue the rotation thereof.

Alternatively, at S4, if the control means 800 does not recognize an incident of the reflected light, the operation goes back to S3, and the control means allows the main body 1100 of the surveying device to continue rotating in the horizontal direction.

After the rotation of the main body 1100 of the surveying device is halted at S5, the operation goes to S6. At S6, the control means 800 drives the optical wave range finder 300.

Then, at S7, the control means 800 controls and drives the rotation driving unit 900 and rotates a motor 80, thus rotating the mirror cylinder 400 in a vertical direction.

Next, at S8, the control means 800 judges whether or not the reflected light has been detected at the optical wave range finder 300. If, at S8, the control means 800 recognizes a detection of the reflected light, the operation goes to S9. At S9, the control means 800 controls the rotation driving unit 900 and stops the rotation of the motor 80, thus halting the rotation of the mirror cylinder 400.

Figure 8:
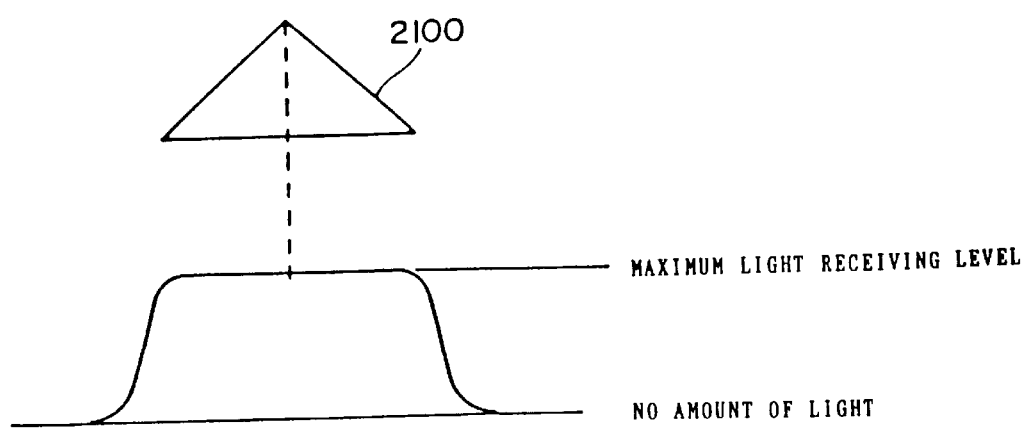
FIG. 8 is a diagram explaining a process of computing a center of mass in the amount of a reflected light at an optical wave range finder and of detecting an altitude angle from the position of the center of mass.

Then, as shown in FIG. 8, the control means 800 computes the center of mass using both an amount of the reflected light at the optical wave range finder 300 and an angle position based on an encoder 85, and detects the altitude angle from the position of the center of mass.

Alternatively, at S8, if the control means 800 does not recognize the detection of the reflected light at the optical wave range finder 300, the operation goes back to S7, and the control means allows the mirror cylinder 400 to continue rotating in the vertical direction.

After determining the horizontal angle and the altitude angle at S5 and at S9, respectively, the operation goes to S10, where the cylindrical lens 130 is switched off and removed, and a pointer beam is generated. Then, at S1, the optical wave range finder 300 performs the range measuring.

The pointer beam is projected into the center of a target plate 2200 in the target 2000. This makes it possible to make sure that the main body 1100 of the surveying device has faced the prism 2100.

The second embodiment constituted above makes it possible to automatically determine a position of the automatic surveying device 1000 so that it turns toward a direction of the prism 2100 on the target 2000.

Also, the other components and functions in the second embodiment are the same as those in the first embodiment, and thus the explanation thereof will be omitted.

"Third Embodiment"

Described below is the description of a third embodiment of the present invention:

The above-mentioned first or second embodiment, by irradiating the target 2000 with "a light which is sector-shaped in an up-and-down direction", determines the horizontal angle from the reflected light, and concerning the altitude angle, detects the altitude angle by using a light at the optical wave range finder and a position of the center of mass in the reflected light at the optical wave range finder, The third embodiment, not using the light at the optical wave range finder, applies to a determination of the altitude angle the method of determining the horizontal angle in the first or second embodiment.

Figure 11:
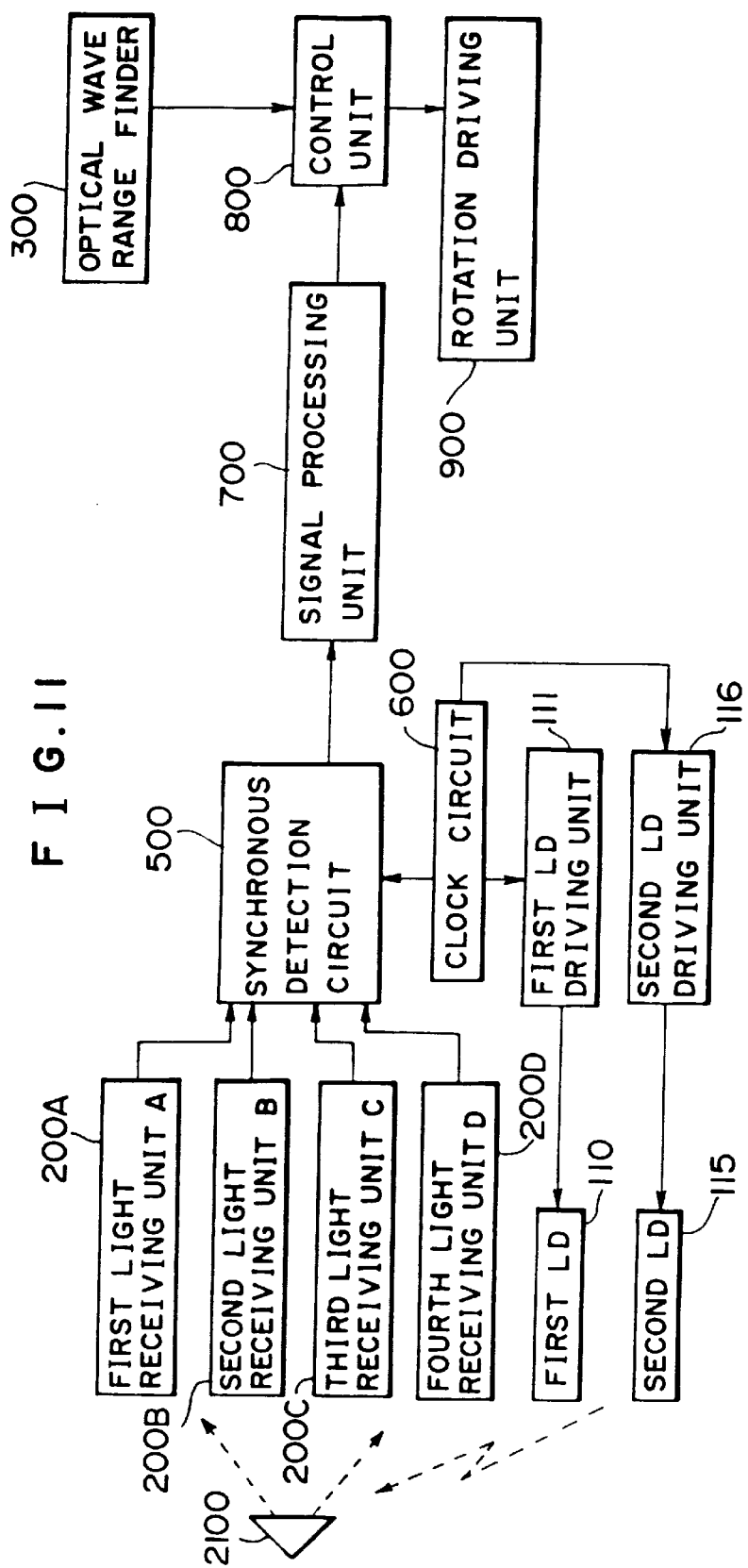
FIG. 11 is a diagram explaining an electrical constitution of an automatic surveying device according to a third embodiment of the present invention.

Next, based on FIG. 11 the description will be given below regarding an electrical constitution of the automatic surveying device 1000 according to the third embodiment.

The third embodiment is constituted by, a first laser diode 110, a second laser diode 115, a first laser diode driving unit 111, a second laser diode driving unit 116, a first light receiving unit 200A and a second light receiving unit 200B, a third light receiving unit 200C and a fourth light receiving unit 200D, an optical wave range finder 300, a synchronous detection circuit 500, a clock circuit 600, a signal processing unit 700, a control unit 800, and a rotation driving unit 900.

The first laser diode 110, as is the case with the first embodiment, is one of the constitutions of a first light emitting means 100 for irradiating with "a light which is sector-shaped in an up-and-down direction", and the first laser diode 110 is constituted to launch out "a light which is sector-shaped in an up-and-down direction" through a first cylindrical lens 130.

The second laser diode 115 is one of the constitutions of a second light emitting means 119 for irradiating with "a light which is sector-shaped in a horizontal direction", and the second laser diode 115 is constituted to launch out "a light which is sector-shaped in a horizontal direction" through a second cylindrical lens 139.

Namely, the second light emitting means 119 is in a configuration obtained by rotating the first light emitting means 100 by 90 degrees, thereby launching out "a light which is sector-shaped in a horizontal direction".

The first light receiving unit 200A and the second light receiving unit 200B, as is the case with the first embodiment, are units for receiving a reflected light of "a light which is sector-shaped in an up-and-down direction" launched out from the first laser diode 110 of the first light emitting means 100.

The third light receiving unit 200C and the fourth light receiving unit 200D are units for receiving a reflected light of "a light which is sector-shaped in a horizontal direction" launched out from the second laser diode 115 of the second light emitting means 109.

The first laser diode driving unit 111, as is the case with the first embodiment, is a unit for driving the first laser diode 110 and causing it to launch out "a light which is sector-shaped in an up-and-down direction".

The second laser diode driving unit 116 is a unit for driving the second laser diode 115 and causing it to launch out "a light which is sector-shaped in a horizontal direction".

Figure 12:
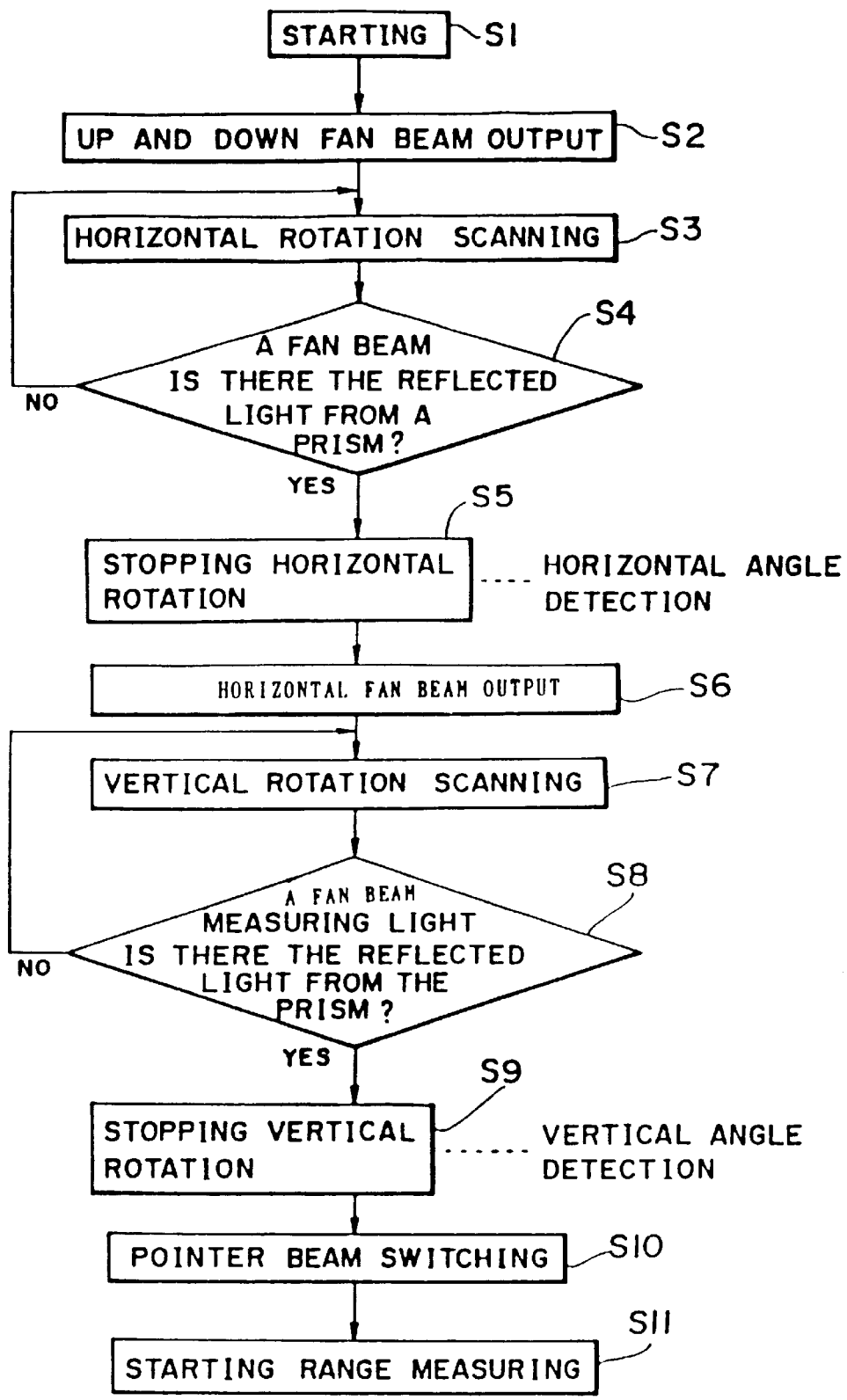
FIG. 12 is a diagram explaining an operation of the third embodiment.
Figure 15:
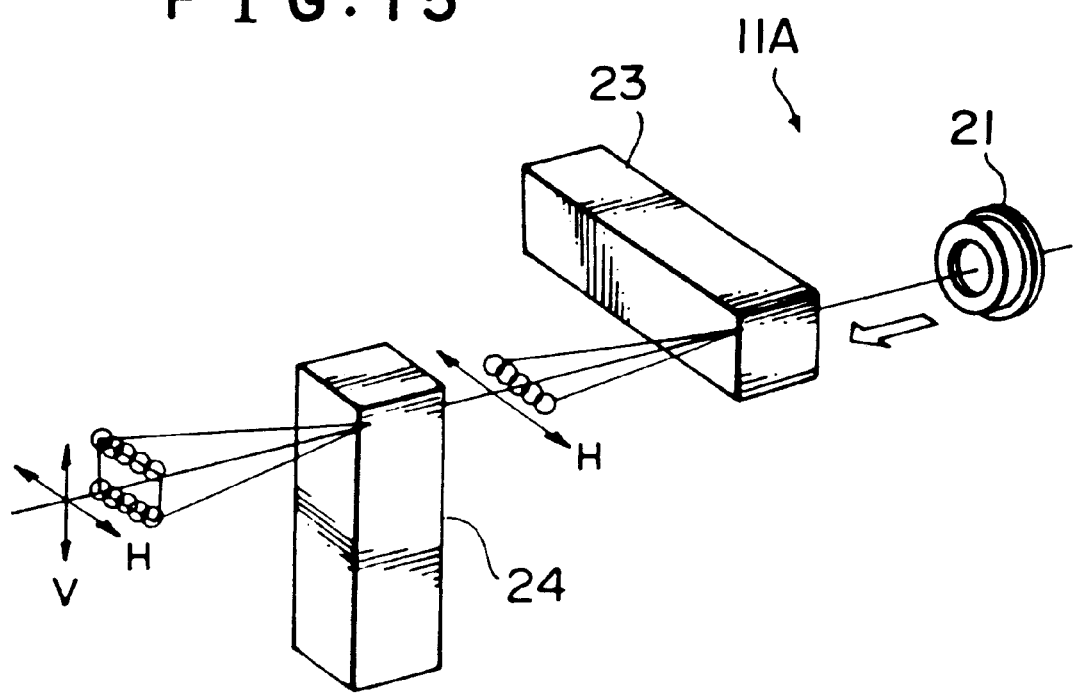
FIG. 15 is a diagram illustrating a prior art.

Based on FIG. 12, the concrete description will be given below concerning an operation of the automatic surveying device 1000 according to the third embodiment constituted above.

First, at Step 1 (hereinafter, abbreviated as S1), a power supply is switched on and a measurement is started.

At S2, the first laser diode driving unit 111, following a timing signal from the cock circuit 600, drives the first laser diode 110, and a light which is sector-shaped in an up-and-down direction (an up-and-down fan beam) is launched out from a first cylindrical lens 130.

Then, at S3, the control means 800 controls and drives the rotation driving unit 900 and rotates a motor 70, thus rotating the main body 1100 of the surveying device in a horizontal direction.

Next, at S4, the control means 800 judges whether or not a reflected light from a target 2000 can be detected at the first light receiving unit 200A or the second light receiving unit 200B. Since the light which is sector-shaped in an up-and-down direction (an up-and-down fan beam) is being launched out from the first cylindrical lens 130, feedback-control is performed until the main body 1100 of the surveying device is situated at a position facing a prism 2100 (a corner cube prism) on the target 2000.

When the reflected light has been launched into the first light receiving unit 200A or the second light receiving unit 200B, a light reception signal, after having been processed by a signal-processing such as a waveform shaping at the signal processing unit 700, is inputted into the control means 800. Then, if the control means 800 recognizes an input of the reflected light as the reflected light from the target 2000, the operation goes to S5. At S5, the control means 800 controls the rotation driving unit 900 and stops the rotation of the motor 70 to halt the rotation of the main body 1100 of the surveying device, thus determining the horizontal angle. Also, when the reflected light has been launched into the second light receiving unit 200B, the control means 800 recognizes the reflected light as an unnecessary reflection, the operation does not go to S5, and the control means allows the main body of the surveying device to continue the rotation thereof.

Alternatively, at S4, if the control means 800 does not recognize an incident of the reflected light, the operation goes back to S3, and the control means allows the main body 1100 of the surveying device to continue rotating in the horizontal direction.

After the rotation of the main body 1100 of the surveying device is halted at S5, the operation goes to S6. At S6, the second laser diode driving unit 116, following a timing signal from the cock circuit 600, drives the second laser diode 115, and a light which is sector-shaped in a horizontal direction (a horizontal fan beam) is launched out from a second cylindrical lens 139.

Then, at S7, the control means 800 controls and drives the rotation driving unit 900 and rotates a motor 80, thus rotating a mirror cylinder 400 in a vertical direction.

Next, at S8, the control means 800 judges whether or not the reflected light from the target 2000 can be detected at the third light receiving unit 200C or the fourth light receiving unit 200D. Since the light which is sector-shaped in a horizontal direction (a horizontal fan beam) is being launched out from the second cylindrical lens 139, feedback-control is performed until the main body 1100 of the surveying device is situated at a position facing the prism 2100 on the target 2000.

When the reflected light has been launched into the third light receiving unit 200C or the fourth light receiving unit 200D, a received light signal, after having been processed by a signal-processing such as a waveform shaping at the signal processing unit 700, is inputted into the control means 800. Then, if the control means 800 recognizes an input of the reflected light as the reflected light from the target 2000, the operation goes to S9. At S9, the control means 800 controls the rotation driving unit 900 and stops the rotation of the motor 80 to halt the rotation of the mirror cylinder 400 in the vertical direction, thus determining the altitude angle. Also, if the control means 800 recognizes the reflected light as an unnecessary reflection, the operation does not go to S9, and the control means allows the mirror cylinder 400 to continue the rotation thereof.

Alternatively, at S8, if the control means 800 does not recognize an incident of the reflected light, the operation goes back to S7, and the control means allows the mirror cylinder 400 to continue rotating in the vertical direction.

After determining the horizontal angle and the altitude angle at S5 and at S9, respectively, the operation goes to S10, where the cylindrical lens 130 is switched off and removed, and a pointer beam is generated. Then, at S11, the optical wave range finder 300 performs the range measuring.

The pointer beam is projected into the center of a target plate 2200 in the target 2000. This makes it possible to make sure that the main body 1100 of the surveying device has faced the prism 2100.

The third embodiment constituted above makes it possible to automatically determine a position of the automatic surveying device 1000 so that it turns toward a direction of the prism 2100 on the target 2000.

Incidentally, the other components and functions in the third embodiment are the same as those in the first or second embodiment, and thus the explanation thereof will be omitted.

Also, the similar effects can be obtained from a constitution that the light which is sector-shaped in a horizontal direction is produced, instead of using the second laser diode 115, by rotating the cylindrical lens 130 mechanically, or by switching off the cylindrical lens 130.

In the present invention constituted above, a light emitting means irradiates a target with a light which is sector-shaped in an up-and-down direction, and a light receiving means receives a reflected light from the target, and a rotating means rotates in a horizontal direction a portion comprising at least the light emitting means and the light receiving means, and a computational processing means is able to detect a position of the target in accordance with a light reception signal from the light receiving means.

The present invention, unlike the case of employing acoustooptic devices, employs a sector-shaped light in order to scan a target. This enables a large extent of scanning to be performed more rapidly and generates less heat, thus making it possible to save the electric power. In addition to this, the present invention employs no expensive acoustooptic devices, which makes it possible to bring about an effect of decreasing the production cost.

The present invention employs no acoustooptic devices. This also leads to no limits in the deflection angle, thus making it possible to bring about a marvelous effect of easily enlarging a scanning extent.

Furthermore, when the present invention is combined with a surveying device having an optical wave range finder, it is possible to provide an automatic surveying device which, requiring less production cost, is less expensive and exhibits higher accuracy.

What is claimed is:

1. A position detection surveying device, comprising;
   light emitting means for irradiating a target with a light which is sector-shaped in an up-and-down direction,
   light receiving means for receiving a reflected light from the target, said light receiving means having a first light receiving portion and a second light receiving portion arranged with said light emitting means between said first and second light receiving portions,
   rotating means for rotating in a horizontal direction a portion comprising at least said light emitting means and said light receiving means, and
   computational processing means for detecting a position of said target in accordance with a light reception signal from said light receiving means in an order of light reception of said first light receiving portion and said second light receiving portion.

2. A position detection surveying device, comprising:
   light emitting means for irradiating a target with a light which is sector-shaped in a vertical direction and a light which is sector-shaped in a horizontal direction,
   light receiving means for receiving reflected light from the target, said light receiving means having a first light receiving portion and a second light receiving portion arranged in the horizontal direction with said light emitting means between said first and second light receiving portions, and a third light receiving portion and a fourth light receiving portion arranged in the vertical direction with said light emitting means between said third and fourth light receiving portions,
   rotating means for rotating, in the horizontal direction and the vertical direction, a portion comprising at least said light emitting means and the light receiving means, and
   computational processing means for detecting a vertical position of said target in accordance with a light reception signal of the reflected light formed by the light which is sector-shaped in the horizontal direction as well as for detecting a horizontal position of said target in accordance with a light reception signal of the reflected light formed by the light which is sector-shaped in the vertical direction.

3. A position detection surveying device, comprising:

light emitting means for irradiating a target with a light which is sector-shaped in an up-and-down direction, light receiving means for receiving a reflected light from the target, said light receiving means having a first light receiving portion and a second light receiving portion arranged with said light emitting means between said first and second light receiving portions, distance measuring means for measuring a distance to the target, rotating means for rotating, in a horizontal direction and a vertical direction, a portion comprising at least said light emitting means, said light receiving means, and the distance measuring means, and computational processing means for detecting a vertical position of said target in accordance with a measurement signal from said distance measuring means, and for detecting a horizontal position of said target in accordance with a light reception signal from said light receiving means.

4. A position detection surveying device as claimed in claim 3, wherein said computational processing means detects an vertical position and a horizontal position of said target by computing a position of the center of mass in the measurement signal from said distance measuring means.

5. A position detection surveying device, as claimed in claim 1 or 2, further comprising distance measuring means for measuring a distance to said target, and wherein said rotating means rotates said distance measuring means together with said light emitting means and said light receiving means.

* * * * *